United States Patent
Chung et al.

(10) Patent No.: US 7,444,740 B1
(45) Date of Patent: Nov. 4, 2008

(54) DAMASCENE PROCESS FOR FABRICATING POLES IN RECORDING HEADS

(75) Inventors: Ki Sup Chung, San Jose, CA (US); Kyusik Sin, Pleasanton, CA (US); Danning Yang, Fremont, CA (US); Yingjian Chen, Fremont, CA (US); Brant Nease, Fremont, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 382 days.

(21) Appl. No.: 11/047,401

(22) Filed: Jan. 31, 2005

(51) Int. Cl.
*G11B 5/127* (2006.01)
*H04R 31/00* (2006.01)

(52) U.S. Cl. .............. 29/603.16; 29/603.13; 29/603.14; 29/603.15; 29/603.18; 216/62; 216/66; 216/67; 360/121; 360/122; 360/317; 451/5; 451/41

(58) Field of Classification Search . 29/603.13–603.16, 29/603.18; 216/62, 66, 67; 360/122, 126, 360/317; 427/127, 128; 451/5, 41
See application file for complete search history.

(56) References Cited

U.S. PATENT DOCUMENTS

| | | | | |
|---|---|---|---|---|
| 5,250,150 | A | * | 10/1993 | Gaud et al. ................... 216/22 |
| 5,953,591 | A | | 9/1999 | Ishihara et al. |
| 6,211,090 | B1 | | 4/2001 | Durlam et al. |
| 6,218,080 | B1 | * | 4/2001 | Wu et al. .................... 430/314 |
| 6,417,561 | B1 | | 7/2002 | Tuttle |
| 6,514,393 | B1 | | 2/2003 | Contolini et al. |
| 6,515,824 | B1 | | 2/2003 | Sato |
| 6,524,491 | B1 | | 2/2003 | Liu et al. |
| 6,540,928 | B1 | | 4/2003 | Kobrin et al. |
| 6,687,083 | B2 | | 2/2004 | Hsiao et al. |
| 6,707,083 | B1 | * | 3/2004 | Hiner et al. .................. 257/295 |
| 6,741,422 | B2 | | 5/2004 | Hsiao et al. |
| 6,776,917 | B2 | | 8/2004 | Hsiao et al. |
| 2002/0012195 | A1 | | 1/2002 | Lahiri et al. |
| 2002/0181162 | A1 | | 12/2002 | Chen et al. |
| 2004/0081391 | A1 | * | 4/2004 | Ko et al. ........................ 385/18 |

OTHER PUBLICATIONS

Okada, T.; Kawato, Y.; Haginoya, C.; Nunokawa, I.; Etoh, K.; Fuyama, M.; "Fabrication process for a trapezoidal main pole for single-pole-type heads", IEEE Transactions on Magnetics, vol. 38, Issue 5, pp. 2249-2252, Sep. 2002.
Okada, T.; Kimura, H.; Nunokawa, I.; Yoshida, N.; Etoh, K.; Fuyama, M.; "Fabricating narrow and trapezoidal main poles for single-pole-type heads", IEEE Transactions on Magnetics, vol. 40, Issue 4, pp. 2329-2331, Jul. 2004.

* cited by examiner

*Primary Examiner*—Paul D Kim
(74) *Attorney, Agent, or Firm*—Strategic Patent Group (57) ABSTRACT

A method and system for manufacturing a pole for a magnetic recording head. The method and system include providing an insulator and fabricating at least one hard mask on the insulator. The at least one hard mask has an aperture therein. The method and system also include removing a portion of the insulator to form a trench within the insulator. The trench is formed under the aperture. The method and system further include depositing at least one ferromagnetic material. The pole includes a portion of the ferromagnetic material within the trench.

2 Claims, 7 Drawing Sheets

DAMASCENE PROCESS FOR FABRICATING POLES IN RECORDING HEADS

FIELD OF THE INVENTION

The present invention relates to magnetic recording technology, and more particularly to a method and system for fabricating a perpendicular recording head.

BACKGROUND OF THE INVENTION

Figure 1:
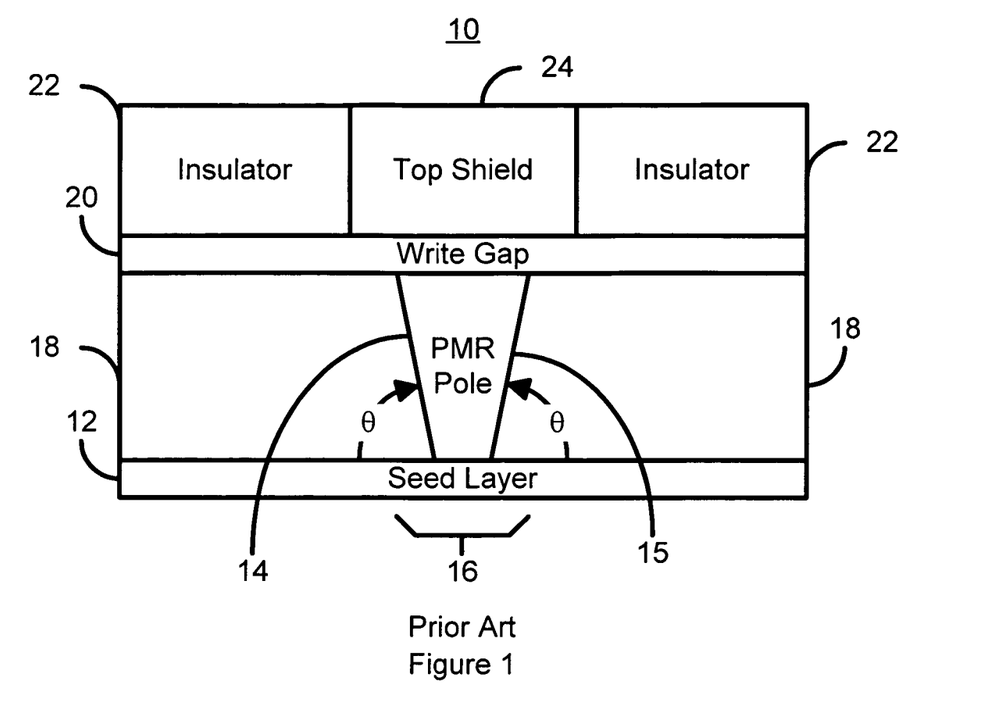
FIG. 1 is diagram depicting a conventional perpendicular magnetic recording pole.

A conventional magnetic recording head includes a transducer deposited on a back surface of a slider. The slider also includes an air-bearing surface (ABS) that faces the recording media. FIG. 1 depicts a portion of conventional perpendicular magnetic recording (PMR) transducer 10 as viewed looking towards the ABS (not shown). The conventional PMR transducer 10 includes a conventional pole 16 and a top shield 24 separated by a write gap 20. Note that the top shield 24 also acts as pole during writing using the conventional PMR transducer 10. The conventional pole 16 and the top shield 24 are surrounded by insulating layers 18 and 22. The conventional pole 16 resides on a seed layer 12 and has sidewalls 14.

In conventional applications, the height of the conventional pole 16 is typically less than approximately three-tenths micrometer. The conventional pole 16 also has acute angles between the seed layer 12 and the sidewalls 14, 15 of the pole, such that the top of the conventional pole 16 is wider than the bottom of the conventional pole 16. Stated differently, each angle θ of the sidewalls 14, 15 is less than 90 degrees in the conventional pole 16 of FIG. 1. A pole having this height and shape is desirable for use in PMR applications.

Figure 2:
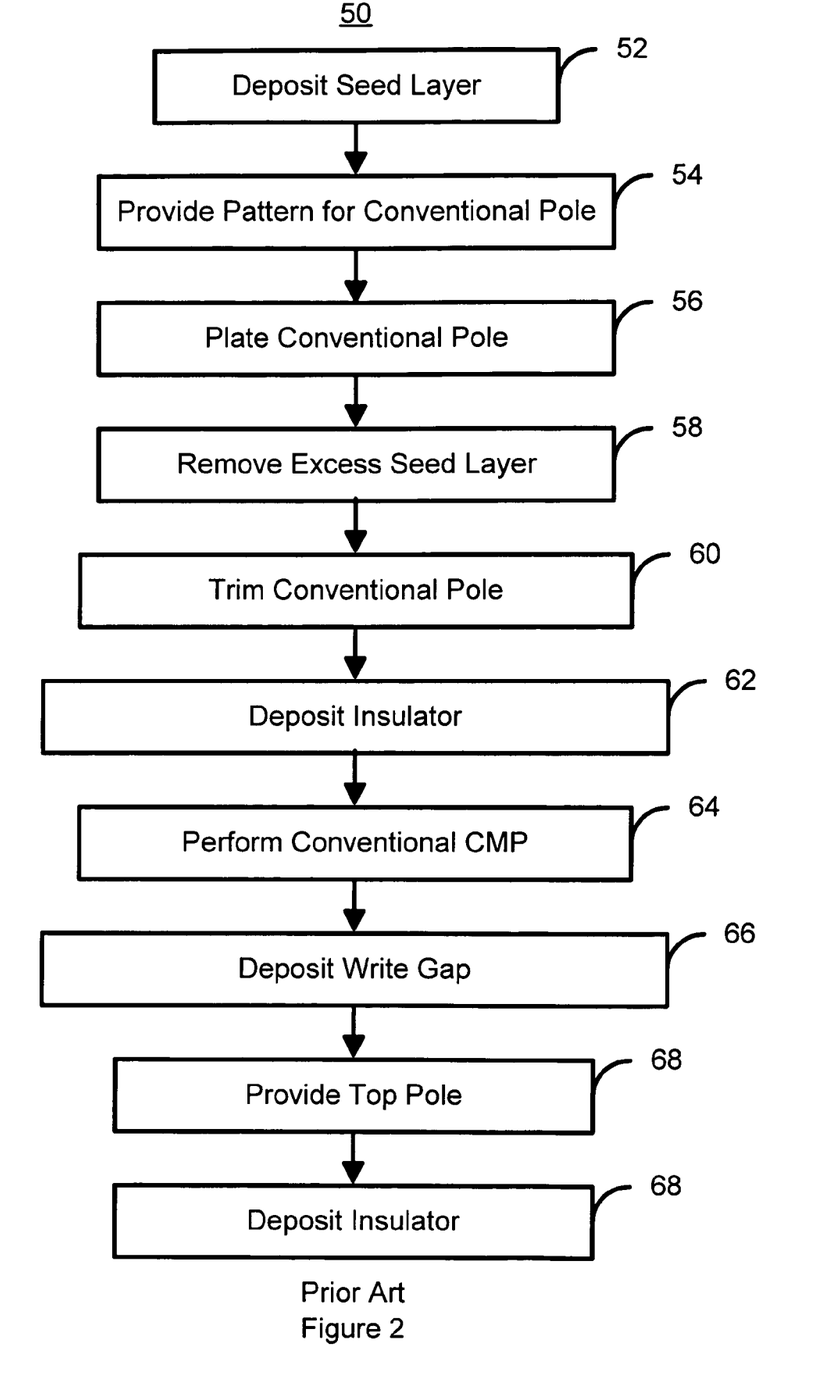
FIG. 2 is a flow chart depicting a conventional method for fabricating a perpendicular magnetic recording pole.

FIG. 2 depicts a conventional method 50 for forming the conventional PMR head 10. A seed layer 12 for the conventional pole 16 is deposited and the pattern for the conventional pole 16 formed, via steps 52 and 54, respectively. The material for the conventional pole 16 is plated, via step 56. The remaining seed layer around the conventional pole 16 is removed, via step 58. The conventional pole 16 is then trimmed, via step 60. Consequently, the width of the conventional pole 16 and the negative angle are set in step 60. The insulator 18 is deposited around the conventional pole 16, via step 62. The insulator is typically alumina. A chemical mechanical planarization (CMP) is performed to planarize the surface and expose the conventional pole 16, via step 64. The surface is planarized in order to allow subsequent processing to be performed as desired. The write gap 20 is provided, via step 66. The top shield 24 that also acts as the pole is deposited and patterned in step 68. Finally, the region around the top shield 24 is insulated, via step 70.

Although the conventional method 50 can be used to form a conventional PMR head 10, the variation in the CMP process used in exposing the conventional pole 16 in step 64 has a relatively large vertical variation. For example, the three-sigma variation in the CMP may be on the order of three-tenths micrometer. Thus the variation in the CMP process can be on the order of the height of the conventional pole 16. As a result, the height of the conventional pole 16 may be extremely difficult to control and fabrication of suitable conventional PMR heads 10 difficult to repeat. Manufacturing of conventional PMR heads 10 may, therefore, have a very low yield.

Accordingly, what is needed is an improved, repeatable method for fabricating a PMR head.

BRIEF SUMMARY OF THE INVENTION

The present invention provides a method and system for manufacturing a pole for a magnetic recording head. The method and system comprise providing an insulator and fabricating at least one hard mask on the insulator. The at least one hard mask has an aperture therein. The method and system also comprise removing a portion of the insulator to form a trench within the insulator. The trench is formed under the aperture. The method and system further comprise depositing at least one ferromagnetic material. The pole includes a portion of the ferromagnetic material within the trench.

According to the method and system disclosed herein, the present invention allows perpendicular recording poles to be fabricated using CMP in processing.

DETAILED DESCRIPTION OF THE INVENTION

Figure 3A:
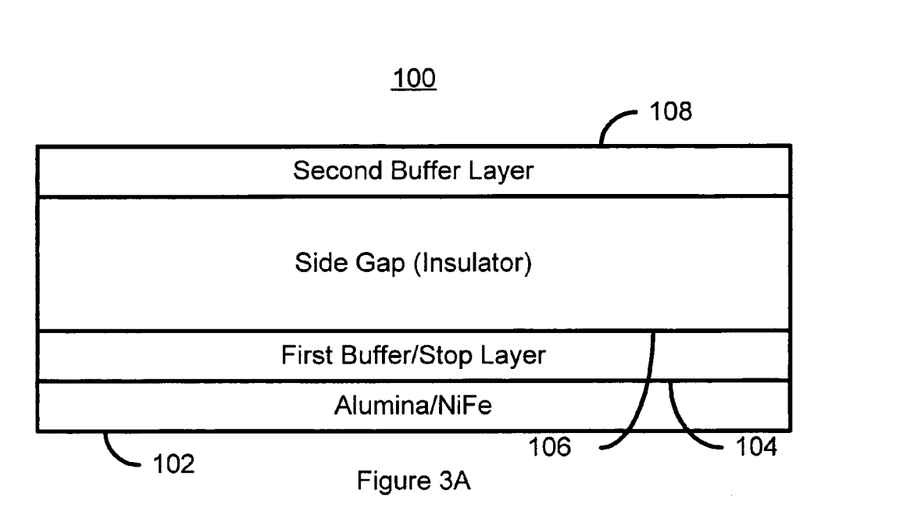
FIGS. 3A-3F depict a perpendicular magnetic recording head formed in accordance with an exemplary embodiment of the present invention.

FIGS. 3A-3F depict a PMR head 100 formed in accordance with an exemplary embodiment of the present invention. To enhance clarity FIGS. 3A-3F are not drawn to scale. FIG. 3A depicts the layers of the PMR head 100 after initial deposition of the layers 102, 104, 106, and 108 surrounding the pole (not shown) and used in fabricating the PMR head 100. The layers includes an etch stop/buffer layer 104 on an underlying layer 102. The underlayer 102 preferably includes a bilayer of alumina on NiFe. The etch stop/buffer layer 104 preferably includes at least one of Ta, TaN, Ti, or TiN. The side gap layer 106 is preferably a low dielectric constant insulating material such as silicon nitride (SiNe), hydrogenated silicon nitride, silicon oxynitride ($SiO_xN_y$), hydrogenated silicon oxynitride, or silicon oxide ($SiO_x$). Such low dielectric constant materials are preferred in order to facilitate processing described below. However, in an alternate embodiment, another insulating material, such as alumina, might be used. The layers also include a second buffer layer 108 that preferably includes at least one of Ta, TaN, Ti, and TiN. The second buffer layer 108 is preferably between fifty and one thousand Angstroms of Ta. The second buffer layer 108 is preferably used to prevent delamination.

Figure 3B:
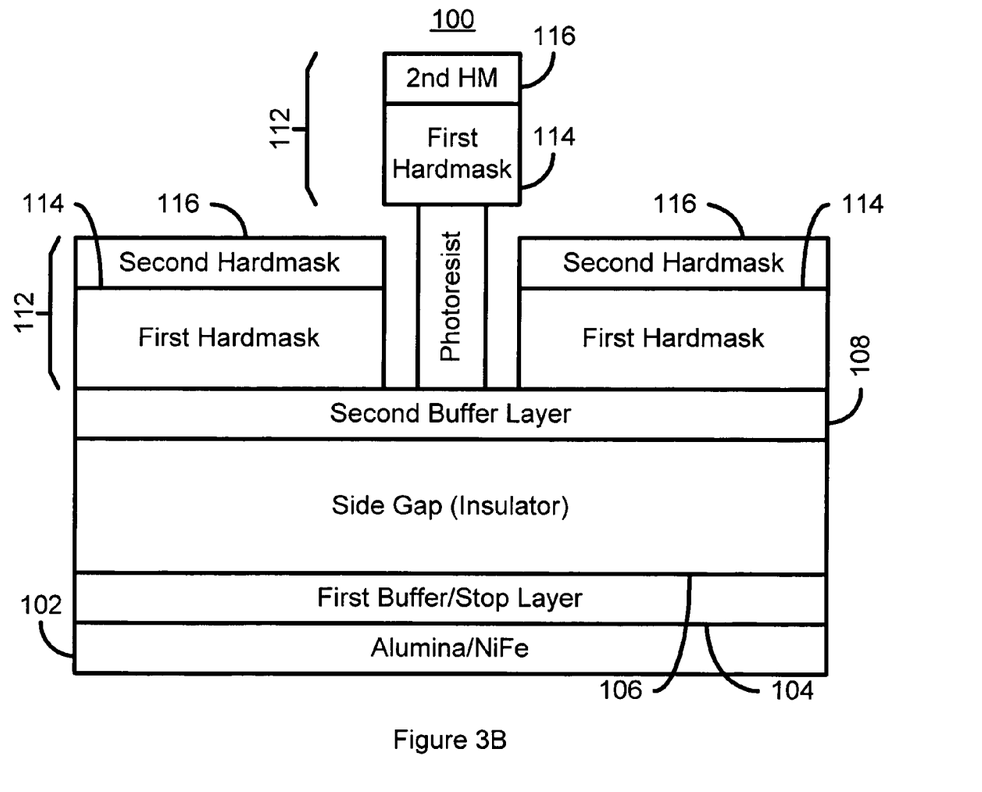

FIG. 3B depicts the PMR head 100 after a lift-off photoresist layer 110 and hard masks 112 have been fabricated. The hard masks 112 preferably include a first hard mask 114 and a second hard mask 116. The first hard mask 114 preferably includes at least one of Ta, TaN, Ti, TiN, and diamond-like carbon (DLC). The first hard mask layer 114 also preferably has a thickness of four hundred to six hundred Angstroms. The first hard mask 114 can also preferably be used as a CMP stop layer. Although depicted as separate layers, when formed of the same materials, the first hard mask 114 and the second buffer layer 108 may be formed to be a single layer. The second hard mask 116 preferably includes at least one of Cr, Ru, NiCr, NiFe, NiNb, CoPt, PtMn, NiFeCr, FeCoN, Co NiFe, and DLC.

Figure 3C:
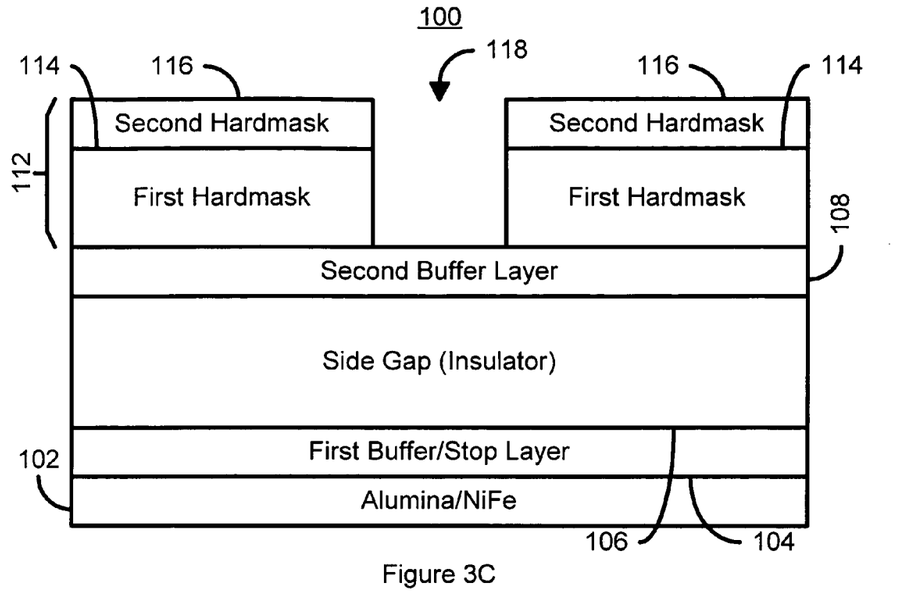
Figure 3D:
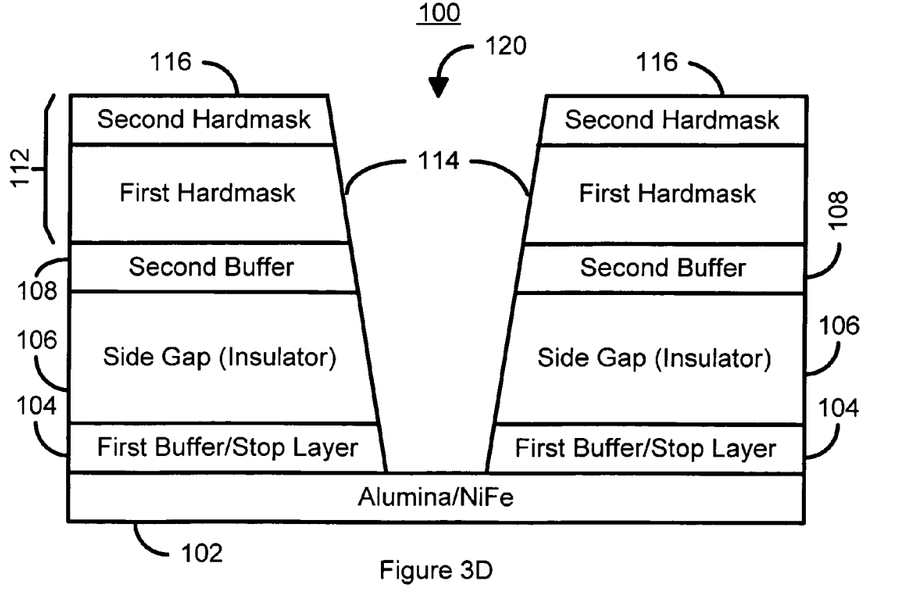

FIG. 3C depicts the PMR head 100 after the photoresist layer 110, as well as the portions of the hard masks 112, have been lifted off. Thus, the hard mask 112 has an aperture 118 therein. FIG. 3D depicts the PMR head 100 after a trench 120 has been provided in the buffer layers 104 and 108 as well as the side gap 106. The trench 120 is preferably formed using inductively coupled plasma (ICP) reactive ion etching (RIE) that does not use a chlorine chemistry. The first hard mask 114 and the second hard mask 116 are each resistant to the process used to remove the side gap layer 106 and form the trench 120. Thus, in a preferred embodiment, the first hard mask 114 and the second hard mask 116 are resistant to ICP RIE. In addition, the materials selected for the side gap 106 may be selected to facilitate formation of the trench 120 using the desired process. Because ICP RIE is preferred for forming the trench 120, the side gap material 106 is preferably silicon nitride, silicon oxynitride, and silicon oxide as discussed above. Use of such materials allows the trench 120 to be formed with the desired profile using ICP RIE.

Figure 3E:
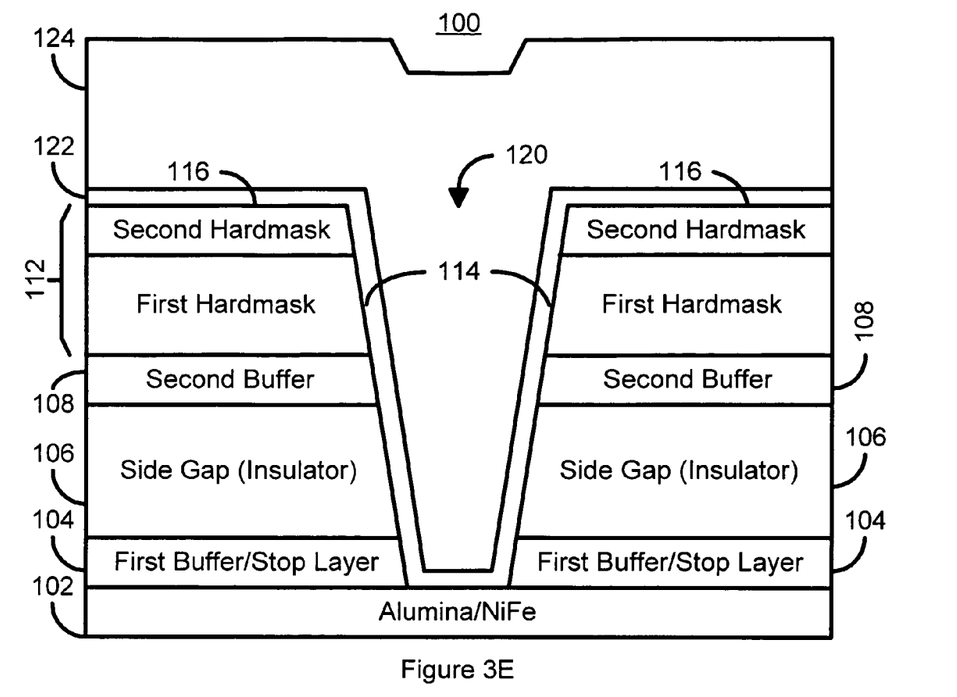
Figure 3F:
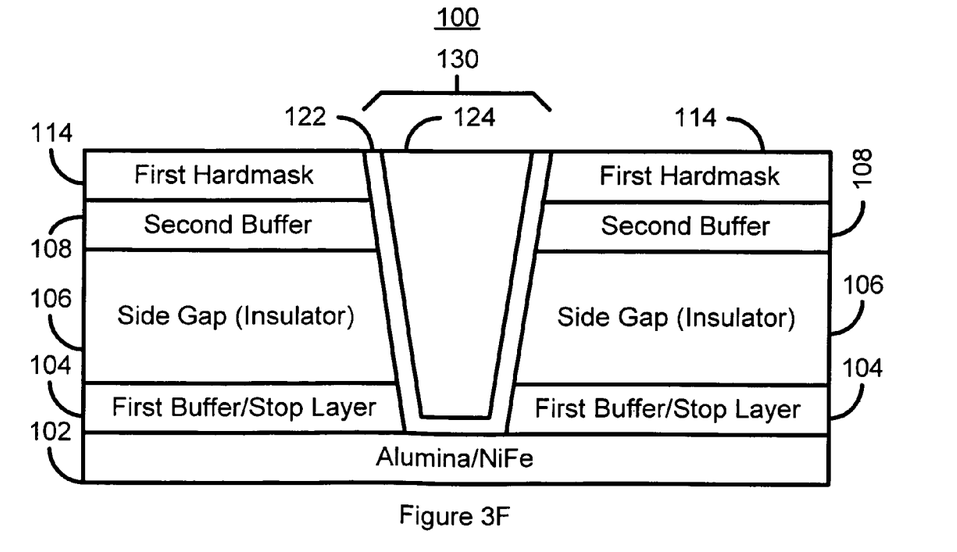

FIG. 3E depicts the PMR head 100 after the trench 120 has been refilled. Thus, a seed layer 122 and ferromagnetic material(s) 124 have been deposited. The ferromagnetic material(s) 124 preferably include CoFe, NiFe, or CoNiFe. FIG. 3F depicts the PMR head 100 after planarization, preferably using a CMP step. The first hard mask layer 114 preferably also functions as a CMP stop layer. Thus, the excess ferromagnetic material(s) 124 have been removed and the pole 130 formed. Note that the top of the pole 130 is at substantially the same height as the remaining portion of the first hard mask layer 114.

The pole 130 has the desired shape and critical dimensions. In particular, the pole 130 is trapezoidal in shape, and has sidewalls having negative angles $\theta_1$ and $\theta_2$. Moreover, when silicon nitride, silicon oxide, and silicon oxynitride are used for the side gap 106, ICP RIE can be used to form the trench 120. In addition, the thickness of the pole is preferably on the order of three-tenths micrometer. Thus, better control of the profile of the trench 120, and thus the pole 130, can be obtained without corroding the pole 130 or requiring an additional cleaning step. Further, the surface of the pole 130 and first hard mask 114 are substantially flat, allowing for a shield (not shown) to be flat.

Figure 4:
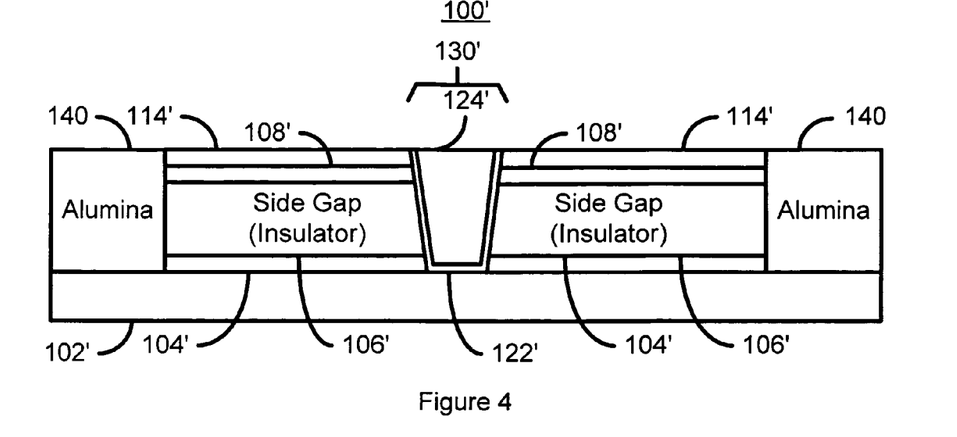
FIG. 4 depicts a perpendicular magnetic recording head formed in accordance with another exemplary embodiment of the present invention.

FIG. 4 depicts another PMR head 100' formed in accordance with a second exemplary embodiment of the present invention. Note that FIG. 4 is not drawn to scale. Fabrication of the PMR head 100' follows in a manner analogous to the PMR head 100 depicted in FIGS. 3A-3F. Consequently, similar structures are labeled in an analogous manner. Thus, the PMR head 100' includes side gap 106', buffer layers 102' and 104', first hard mask 114, and pole 130'. In addition, the PMR head 100' has undergone further processing. Portions of the side gap 106', buffer layers 102' and 104', and first hard mask 114 have been removed and replaced with another material 140. The material 140 is preferably alumina. Also in a preferred embodiment, the alumina 140 resides at least one micron from the pole 130.

The PMR head 100' has the desired shape and critical dimensions for the pole 130'. In addition, the trench 120' may be formed without adversely affecting the corrosion of materials used in the pole 130'. The top surface of the pole 130' and surrounding materials 114' are also substantially flat. Further, use of the alumina 140 allows the PMR head 100' to include materials that more closely track those used in the conventional PMR head 10.

Figure 5:
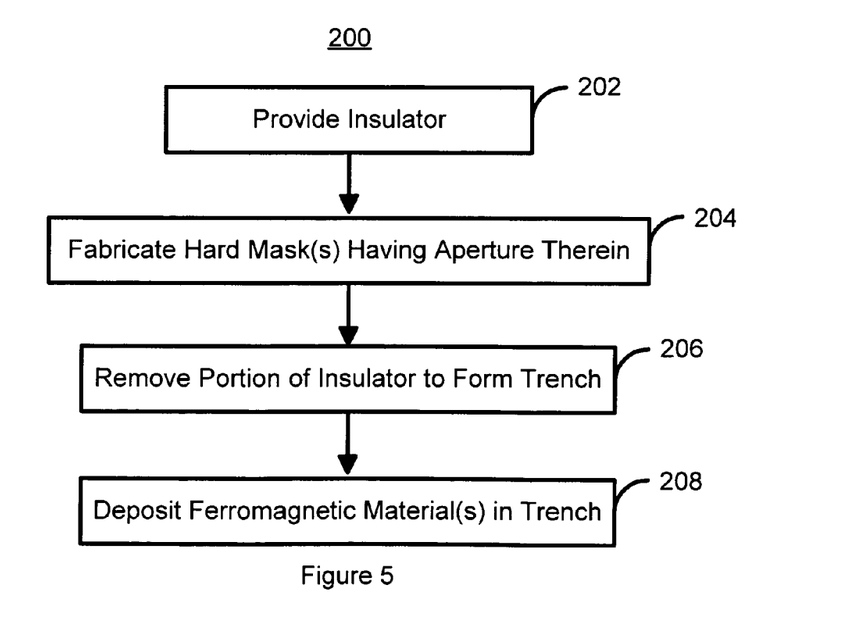
FIG. 5 is a high-level flow chart depicting a method in accordance with an exemplary embodiment of the present invention for fabricating a perpendicular magnetic recording pole.

FIG. 5 is a high-level flow chart depicting a method 200 in accordance with an exemplary embodiment of the present invention for fabricating a perpendicular magnetic recording pole. The method 200 is described in the context of forming a single PMR head 100. However, one of ordinary skill in the art will readily recognize that typically multiple PMR heads 100 are fabricated simultaneously on a substrate. One of ordinary skill in the art will also readily recognize that other and/or additional steps not inconsistent with the present invention may be included in the method 200. Further, although the method 200 is described here in the exemplary context of PMR heads, the method 200 may be used in the context of another recording head (not shown).

An insulator, for example for the side gap 106 and buffer layers 104 and 108, is provided, via step 202. At least one hard mask is fabricated on the insulator such that the hard mask(s) have an aperture therein, via step 204. In a preferred embodiment, step 204 includes providing the first hard mask 114 and the second hard mask 116, as well as the aperture 118. A portion of the insulator is removed to form a trench 120 within the insulator, via step 206. In a preferred embodiment, ICP RIE is used to form the trench 120. Consequently, the materials used in step 204 should be capable of being removed using ICP RIE, leaving a trench 120 having the desired profile. However, in an alternate embodiment, other materials such as alumina might be used. In such an embodiment, step 206 could include using RIE in a chlorine chemistry. However, in order to prevent corrosion of the pole 130 in such an embodiment, step 206 would include a cleaning step. The trench 120 is formed under the aperture in the masks 114 and 116. At least one ferromagnetic material is deposited in the trench 120, via step 208. Step 208 may thus include providing a seed layer 122 as well as the ferromagnetic material(s) 124 that form the pole. The pole 130 includes a portion of the ferromagnetic material(s) that lie within the trench 120.

Thus, the method 200 can be used in providing the PMR head 100 and/or 100'. Because the method 200 is a damascene method, providing the trench 120 then filling the trench 120, the pole 130 has the desired shape and critical dimensions. Moreover, when ICP RIE is used to form the trench 120 in step 206, better control of the profile of the trench 120, and thus the pole 130, can be obtained without corroding the pole 130 or requiring an additional cleaning step.

Figure 6:
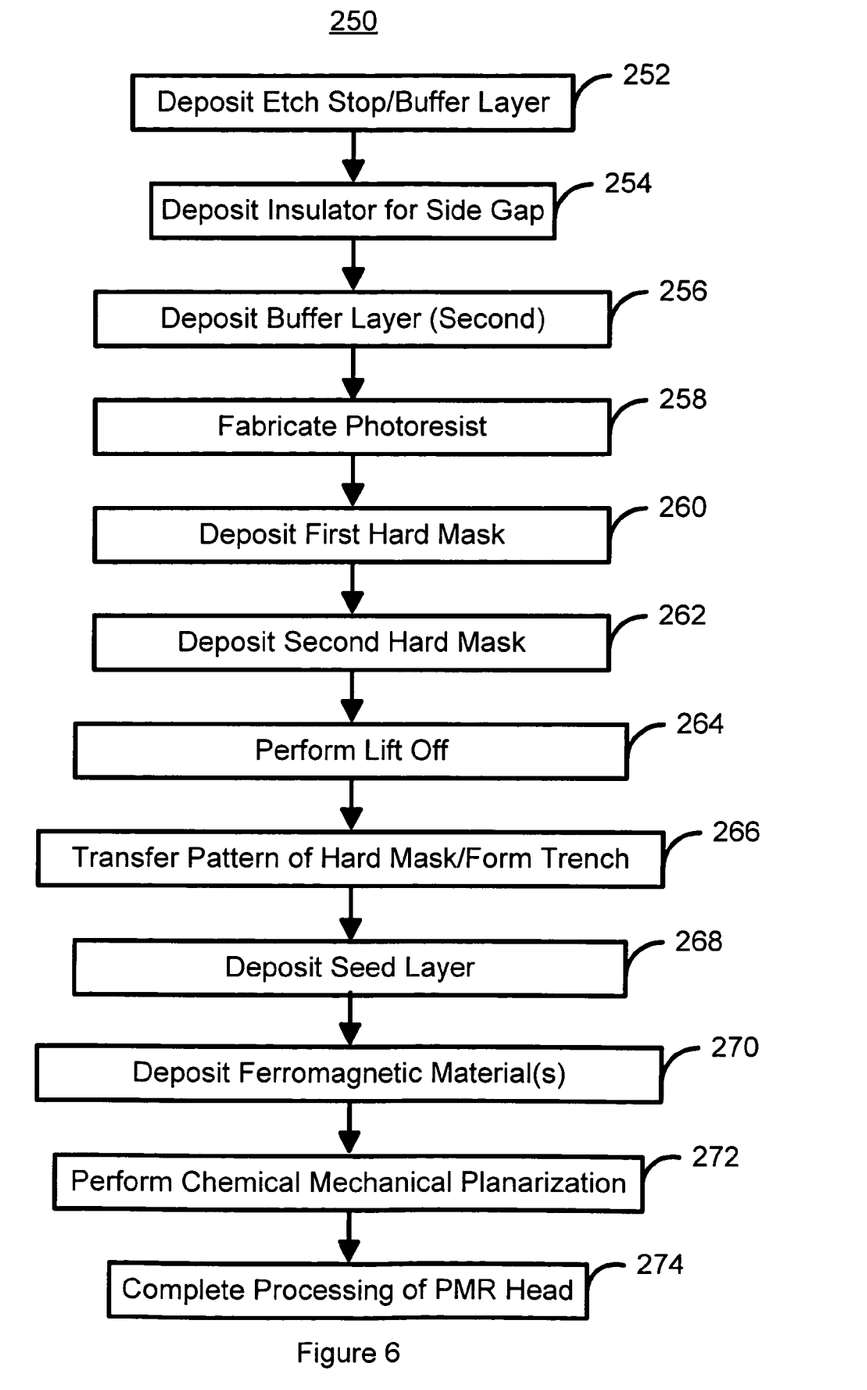
FIG. 6 is a flow chart depicting a method for providing a perpendicular magnetic recording pole in accordance with an exemplary embodiment of the present invention.

FIG. 6 is a more detailed flow chart depicting a method 250 for providing a perpendicular magnetic recording pole in accordance with an exemplary embodiment of the present invention. The method 250 is described in the context of forming a single PMR head 100. However, one of ordinary skill in the art will readily recognize that typically multiple PMR heads 100 are fabricated simultaneously on a substrate. One of ordinary skill in the art will also readily recognize that other and/or additional steps not inconsistent with the present invention may be included in the method 250. Further, although the method 250 is described here in the exemplary context of PMR heads, the method 250 may be used in the context of another recording head (not shown).

The etch stop/buffer layer 104 is deposited, via step 252. Step 252 is preferably accomplished using chemical vapor deposition (CVD) or sputtering. The insulator for the side gap layer 102 is deposited, for example by CVD or sputtering, via step 254. A second buffer, or capping, layer 108 is deposited, via step 256. Step 256 is also preferably performed using CVD or sputtering. The photoresist 110 used in patterning the hard mask is deposited and patterned, via step 258. The first hard mask 114 and second hard mask are deposited, via steps 260 and 262. Lift off is performed, via step 264. Thus, the aperture 118 in the mask 110 is formed. The pattern in the hard mask 110, for example the aperture 120, is transferred to the underlying layers 104, 106 and 108, via step 266. In a preferred embodiment, step 266 is performed using ICP RIE. Thus, the trench 120 is formed.

After the trench 120 is formed, the seed layer 122 is deposited, via step 268. The ferromagnetic material(s) 124 for the pole 130 are then plated onto the seed layer 122, via step 270. Excess ferromagnetic material(s) lie outside of the trench 120. In addition, the ferromagnetic material(s) 124 may have a top surface that reflects the underlying topology and is, therefore, not flat. A CMP is performed, via step 272. As a result, the excess portion of the ferromagnetic material(s) 124 has been removed and the top surface is flat. Consequently, the pole 130 is formed. Portions of the insulator for the side gap 106 that are remote from the pole 130 are optionally replaced with a different insulator, via step 274. If step 274 is performed, the PMR head 100' may result. Processing is completed, via step 276. For example, an additional shield or other components may be fabricated.

Thus, the method 250 can be used to produce the PMR head 100 and/or 100' with a desired profile and by a simpler process.

We claim:

1. A method for manufacturing a pole for a magnetic recording head comprising:

providing an insulator;

fabricating at least one hard mask on the insulator, the at least one hard mask having an aperture therein;

removing a portion of the insulator to form a trench within the insulator, the trench being formed under the aperture;

depositing at least one ferromagnetic material, the pole including a portion of the ferromagnetic material within the trench; and performing a chemical mechanical planarization on the at least one ferromagnetic material wherein the performing the chemical mechanical planarization further includes:

utilizing a portion of the at least one hard mask as a stop for the chemical mechanical planarization.

2. The method of claim 1 wherein a first hard mask of the at least one hard mask is used as the stop for the chemical mechanical planarization.

* * * * *